US009840588B2

(12) United States Patent
Corley et al.

(10) Patent No.: US 9,840,588 B2
(45) Date of Patent: Dec. 12, 2017

(54) EPOXY RESIN CURING COMPOSITIONS AND EPOXY RESIN SYSTEMS INCLUDING SAME

(75) Inventors: Larry Steven Corley, Houston, TX (US); Carlton E. Ash, Sugar Land, TX (US)

(73) Assignee: HEXION INC., Columbus, OH (US)

(*) Notice: Subject to any disclaimer, the term of this patent is extended or adjusted under 35 U.S.C. 154(b) by 253 days.

(21) Appl. No.: 12/642,420

(22) Filed: Dec. 18, 2009

(65) Prior Publication Data

US 2011/0152448 A1 Jun. 23, 2011

(51) Int. Cl.
| C08L 63/00 | (2006.01) |
| C08L 83/02 | (2006.01) |
| C08G 77/02 | (2006.01) |
| C08L 81/02 | (2006.01) |
| C08G 69/00 | (2006.01) |
| C08G 75/02 | (2016.01) |
| C08G 79/02 | (2016.01) |
| C08G 59/00 | (2006.01) |
| C08G 69/34 | (2006.01) |
| C08G 59/50 | (2006.01) |
| C08G 59/56 | (2006.01) |
| C08G 73/02 | (2006.01) |
| C08L 79/02 | (2006.01) |
| C08L 33/14 | (2006.01) |

(52) U.S. Cl.
CPC .......... *C08G 69/34* (2013.01); *C08G 59/50* (2013.01); *C08G 59/504* (2013.01); *C08G 59/56* (2013.01); *C08G 73/028* (2013.01); *C08L 79/02* (2013.01); *C08L 33/14* (2013.01)

(58) Field of Classification Search
None
See application file for complete search history.

(56) References Cited

U.S. PATENT DOCUMENTS

| 2,640,037 | A | | 5/1953 | Parry et al. |
| 2,651,589 | A | | 9/1953 | Shokal et al. |
| 2,915,485 | A | | 12/1959 | Shokal |
| 3,367,991 | A | * | 2/1968 | Hicks .......................... 525/511 |
| 3,477,990 | A | | 11/1969 | Dante et al. |
| 3,563,957 | A | | 2/1971 | Beebe |
| 3,811,911 | A | | 5/1974 | Doi |
| 4,051,195 | A | | 9/1977 | McWhorter |

(Continued)

FOREIGN PATENT DOCUMENTS

| CN | 101040017 | 9/2007 |
| WO | WO 2007/077888 A1 | 7/2007 |
| WO | WO 2007/082853 A1 | 7/2007 |

OTHER PUBLICATIONS

Tomamine Ether Amines product guide, 2008, Airproducts, Pub. No. 120-06-067-US.*

(Continued)

*Primary Examiner* — Jeffrey Washville

(57) ABSTRACT

Disclosed are epoxy resins exhibiting a highly favorable combination of tensile strength and elongation with respect to prior art epoxy systems. The elastomeric epoxy resin systems of the invention are prepared utilizing a curing agent containing at least one monoprimary amine, and are particularly useful in applications such as, for example, castings, potting, composites, crack sealing, coatings, adhesives, roofing materials, flooring or reinforced membranes.

16 Claims, 1 Drawing Sheet

(56) References Cited

U.S. PATENT DOCUMENTS

| | | | |
|---|---|---|---|
| 4,162,998 A | | 7/1979 | Doi et al. |
| 4,178,427 A | | 12/1979 | Waddill et al. |
| 4,316,003 A | * | 2/1982 | Dante et al. .................. 528/111 |
| 4,320,047 A | | 3/1982 | Murphy et al. |
| 4,581,454 A | | 4/1986 | Myers et al. |
| 4,734,468 A | | 3/1988 | Marx |
| 4,910,270 A | * | 3/1990 | Maekawa et al. ............ 525/532 |
| 5,334,654 A | * | 8/1994 | Starner .................. C08L 63/00 252/182.18 |
| 5,602,211 A | * | 2/1997 | Hefner et al. ................. 525/430 |
| 6,127,508 A | * | 10/2000 | Corley et al. .............. 528/111.3 |
| 6,395,845 B1 | | 5/2002 | Weinmann et al. |
| 6,500,912 B1 | * | 12/2002 | Corley .......................... 528/113 |
| 2002/0072576 A1 | * | 6/2002 | Schrotz ................ C08G 59/184 525/526 |
| 2002/0110643 A1 | | 8/2002 | Sokol |
| 2007/0287808 A1 | * | 12/2007 | Vedage et al. ................ 525/423 |
| 2008/0200599 A1 | | 8/2008 | Grasboeck et al. |
| 2009/0247712 A1 | | 10/2009 | Tanaka et al. |
| 2011/0152468 A1 | | 6/2011 | Corley et al. |

OTHER PUBLICATIONS

Viscosity Conversion Chart, McCullough, 2007.*
Huntsman, Jeffamine Polyetheramines, 2007.*
Puig et al., Epoxy Networks with Physical Cross-Links Produced by Tail-to-Tail Associations of Alkyl Chains, Macromolecules XXXX, XXX, 000-000 (Publication Date Oct. 19, 2009).
Zucchi et al., Self-Assembly of Gold Nanoparticles as Colloidal Crystals Induced by Polymerization of Amphiphilic Monomers, Macromolecules 2008, 4895-4903, vol. 41, No. 13.
Armeen OD, AkzoNobel, product catalog 2010.
American Chemical Society, CAS registry information for cocoamines, CAS 61788-46-3, 2012, American Chemical Society, webpage.
Henan Kingway Chemicals Co., Ltd, Cocoamine webpage, http://hnkingway.en.alibaba.com/product/344231851-209531281/Cocoamine.html, 2012, webpage.
Viachem Inc., Corsamine™ products webpage, http://www.viacheminc.com/corsitech/corsamine, 2012, Viachem Inc., webpage.

* cited by examiner

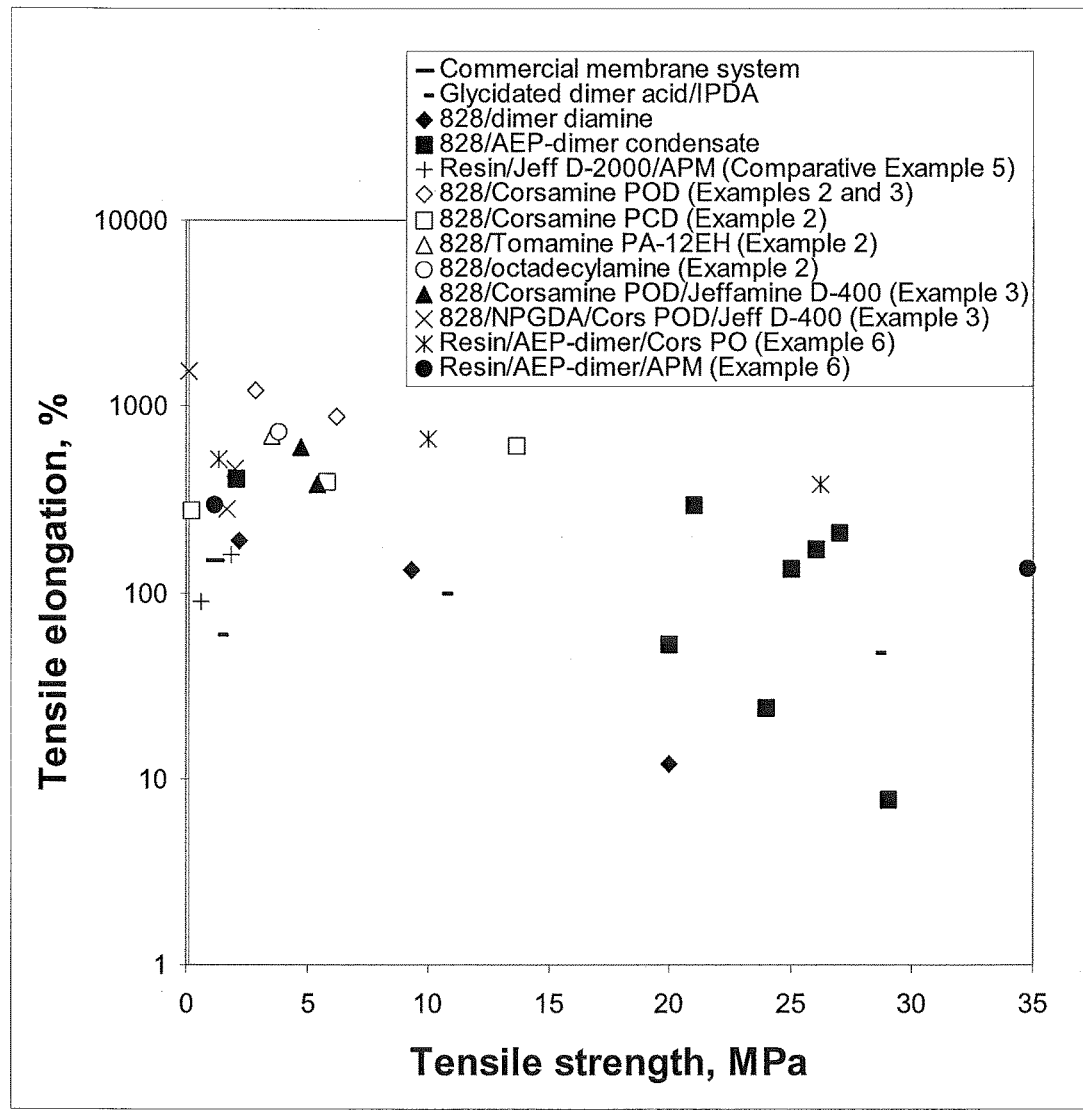

EPOXY RESIN CURING COMPOSITIONS AND EPOXY RESIN SYSTEMS INCLUDING SAME

FIELD OF THE INVENTION

The present invention relates to curing compositions for epoxy resin systems and to epoxy resin, prepared utilizing the curing composition, and exhibiting a highly favorable combination of tensile strength and elongation with respect to prior art epoxy systems. The present invention also relates to methods of preparing elastomeric epoxy resin systems and to articles made therefrom. The elastomeric epoxy resin systems of the invention include a curing agent containing at least one monoprimary amine, and are particularly useful in applications such as, for example, castings, potting, composites, crack sealing, coatings, adhesives, roofing materials, flooring or reinforced membranes.

BACKGROUND OF THE INVENTION

In the preparation of flexible, elastomeric or high-elongation epoxy resin systems, flexibility and low $T_g$ are typically introduced into the system through the epoxy resin, the curing agent or both.

Epoxy resins which impart flexibility to cured epoxy resin systems include epoxidized vegetable oils, glycidated dimerized fatty acids and poly(propylene oxide) glycols of various molecular weights having glycidyl end groups. Epoxidized vegetable oils are inexpensive but cure very poorly, if at all, with aliphatic amines at room temperature. They do cure with strong acid curing agents but the resultant cured materials are weak and easily torn. Glycidated dimerized fatty acids are expensive low-volume products prepared by a difficult batch process. They have limited storage stability, and cured materials prepared with them tend to have high water absorption. Glycidated poly(propylene oxide) glycols are also expensive low-volume resins which tend to cure relatively slowly, and which tend not to give high network strength.

Curing agents which impart flexibility to epoxy systems include long-chain poly(propylene oxide) diamines, "dimer diamines" produced by conversion of dimerized fatty acids to nitriles and subsequent hydrogenation of the nitrile groups to amine groups, and condensates of dimerized fatty acids with amines containing one primary and one secondary amine group (such as N-(aminoethyl)piperazine or aminoethylethanolamine) or two secondary amine groups (such as piperazine). All of these curing agents have various disadvantages. The long-chain poly(propylene oxide) diamines cure epoxy resins extremely slowly at room temperature, often taking more than a day to gel the epoxy resins even when highly accelerated. The "dimer diamines" are faster curing than the long-chain poly(propylene oxide) diamines but are very expensive and, like the poly(propylene oxide) diamines, tend to give cured systems with low tensile strength at given elongation.

The condensates of dimerized fatty acids with amines containing one primary and one secondary amine group or two secondary amine groups (e.g., U.S. Pat. Nos. 6,127,508 and 6,500,912) overcome a number of these disadvantages in that cure is fairly fast and also the cured products have relatively high tensile strength at a given elongation level. However, a major disadvantage of these dimer acid-amine condensate curing agents is their high viscosity, generally well above 10 Pa-s (10000 cP) and often above 30 Pa-s (30000 cP) at 25° C. The high viscosity renders mixing and degassing at room temperature fairly difficult. The viscosity of the curing agent can be reduced by addition of standard polyamine curing agents such as aminoethylpiperazine and other ethyleneamines, and also by nonreactive diluents such as ethoxylates of detergent-range alcohols. However, the low amine hydrogen equivalent weight of the polyamines severely limits the amount of polyamine which can be used as a diluent without unacceptable loss of cured resin elongation. This maximum amount is typically insufficient to give the desired viscosity reduction. When the nonreactive diluents such as ethoxylates of detergent-range alcohols are used, the incorporation of enough diluent to reduce viscosity significantly will tend to cause the cured resin products to become soft and weak (e.g., U.S. Pat. No. 6,127,508, Example 4).

In light of the above, there is a need in the art for curing agents for elastomeric epoxy resin systems which are inexpensive, cure rapidly at ambient temperatures, have low viscosity at ambient temperatures, and which produce cured elastomeric epoxy resins exhibiting improved tensile strength and elongation when compared to the prior art resin compositions.

SUMMARY OF THE FIGURE

FIG. 1 is a plot of combinations of tensile properties of the inventive compositions relative to those of the prior art.

SUMMARY OF THE INVENTION

In one aspect, the invention relates to a composition including an epoxy resin system, which system includes a reaction product of an epoxy resin component and a curing agent. The curing agent includes a monoprimary amine represented by any one of the formulae R'—O—R—NH$_2$, R'S—R—NH$_2$, R'$_2$N—R—NH$_2$, R'$_2$P—R—NH$_2$, or R'$_3$Si—RNH$_2$ wherein each of R or R' is independently a hydrocarbyl group such that a combination of R plus all R' groups contains a total of between about 8 and about 50 carbon atoms. The cured reaction product of the epoxy resin component and the curing agent exhibits a tensile strength of >1 MPa and an elongation of >100% as measured by ASTM D-638 at 25° C.

In another aspect, the invention relates to a composition including an epoxy resin system, which system includes a reaction product of an epoxy resin component and a curing agent. The curing agent includes a monoprimary amine represented by the formula R'—O—R—NH$_2$ wherein each of R or R' is independently a hydrocarbyl group such that a combination of R plus R' contains a total of between about 8 and about 50 carbon atoms. The cured reaction product of the epoxy resin component and the curing agent exhibits a tensile strength of >1 MPa and an elongation of >100% as measured by ASTM D-638 at 25° C.

In another aspect, the invention relates to a composition including an epoxy resin system, which system includes a reaction product of an epoxy resin component and a curing agent. The curing agent includes a monoprimary amine represented by the formula R'$_2$N—R—NH$_2$ wherein each of R or R' is independently a hydrocarbyl group such that a combination of R plus both R' groups contains a total of between about 8 and about 50 carbon atoms. The cured reaction product of the epoxy resin component and the curing agent exhibits a tensile strength of >1 MPa and an elongation of >100% as measured by ASTM D-638 at 25° C.

DETAILED DESCRIPTION OF THE INVENTION

The epoxy resin system of the invention includes at least one epoxy resin component and a curing agent containing at least one monoprimary amine.

A. Epoxy Resin Component

The elastomeric epoxy resin systems of the invention include at least one epoxy resin component. Epoxy resins are those compounds containing at least one vicinal epoxy group. The epoxy resin may be saturated or unsaturated, aliphatic, cycloaliphatic, aromatic or heterocyclic and may be substituted. The epoxy resin may also be monomeric or polymeric.

Epoxy Resin

In one embodiment, the epoxy resin component may be prepared by reacting epichlorohydrin with a compound containing at least one, two or more, hydroxyl groups under basic conditions, such as in an alkaline reaction medium or in the presence of a suitable base. Examples of such suitable epoxy resin components include, but are not limited to, polyglycidyl ethers of poly- or dihydric phenols, polyglycidyl ethers of glycols or polyglycols, epoxy novolacs, other glycidated polyphenolic resins, polyglycidyl esters of polycarboxylic acids, fusion reaction products between these epoxy resins and additional polyhydric phenolic compounds as those disclosed and described in U.S. Pat. Nos. 3,477,990 and 4,734,468, and mixtures thereof. Examples of suitable phenolic compounds used in preparing these epoxy resins include, but are not limited to resorcinol, catechol, t-butylcatechol, hydroquinone, bisphenol A (BPA), bisphenol E (BPE), bisphenol F (BPF), tris(4-hydroxyphenyl)methane, 1,1-bis(4-hydroxyphenyl)isobutane, 2,2-bis(4-hydroxyphenyl)butane, 2,2-bis(4-hydroxy-3-tert-butylphenyl)propane, 1,1-bis(4-hydroxyphenyl)cyclohexane, 2,6,2',6'-tetrachloro-p, p'-bisphenol A, 2,6,2',6'-tetrabromo-p,p'-bisphenol A, 2,6, 2',6'-tetramethyl-3,5,3'-tribromo-p-p'-biphenol, 2,6,2',6'-tetramethyl-3,5,3',5'-tetrabromo-p,p'-biphenol, tetramethylbiphenol, 1,5-dihydroxynaphthalene, bis(2-hydroxy-1-naphthyl)methane, bis(4-hydroxyphenyl)sulfone, bis(4-hydroxyphenyl)ether and the like and mixtures thereof. Examples of such epoxy resin components include, but are not limited to, EPON Resins 825, 826, 828, 862 and 1001 commercially available from Hexion Specialty Chemicals, Inc.

Epoxy Resin Modified with Monofunctional or Polyfunctional Epoxy Diluents

In another embodiment, the epoxy resin component optionally includes polyglycidyl ethers of aliphatic or cycloaliphatic glycols or triols or polyols, or polyglycols. Examples of these glycols include, but are not limited to, 1,4-butanediol, 1,5-pentanediol, 1,6-hexanediol, neopentyl glycol, cyclohexanedimethanol, hydrogenated BPA, polyethylene glycol, polypropylene glycol, trimethylolethane, trimethylolpropane and mixtures thereof. Similar to the di- and polyhydric phenol based epoxy resins, these aliphatic glycidyl and polyglycidyl ethers are usually prepared by reacting epichlorohydrin with a selected aliphatic diol (or triol or polyol or polyglycol or mixtures) in the presence of a Lewis acid catalyst, followed by conversion of the reaction intermediate(s) with sodium hydroxide to the product(s). Commercially available examples of such epoxy resin diluent components include, but are not limited to, HELOXY Modifier 32 (a diglycidyl ether of a poly(propylene oxide) glycol), HELOXY Modifier 68 (the diglycidyl ether of neopentyl glycol) and HELOXY Modifier 107 (the diglycidyl ether of 1,4-cyclohexanedimethanol) from Hexion Specialty Chemicals, Inc.

The optional polyglycidyl ethers of aliphatic or cycloaliphatic glycols or triols or polyols, or polyglycols are blended with the epoxy resin component in a weight ratio of from 0 to up to about 100 parts of ether for each 100 parts of epoxy resin component. In another embodiment, the polyglycidyl ethers of aliphatic or cycloaliphatic glycols or triols or polyols, or polyglycols are blended with the epoxy resin component in a weight ratio of about 5 to about 100 parts of ether for each 100 parts of epoxy resin component.

Epoxy Resin Modified with a Polyacrylate or Polymethacrylate Ester of a Polyol

In another embodiment, the epoxy resin component optionally includes a polyacrylate or polymethacrylate ester of a polyol which contain more than one terminal acrylate or methacrylate group. These esters are the acrylic and methacrylic acid esters of aliphatic polyhydric alcohols such as, for example, the di- and polyacrylates and the di- and polymethacrylates of alkylene glycols, alkoxylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dip entaerythritol, tripentaerythritol and the like, or mixtures of these with each other or with their partially esterified analogs.

Typical compounds include but are not limited to trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and the like. Particularly preferred esters are 1,6-hexanediol diacrylate, trimethylolpropane triacrylate, pentaerythritol triacrylate, and pentaerythritol tetraacrylate.

Additional acrylate or methacrylate esters of polyols are the acrylate or methacrylate esters of epoxide resins, wherein epoxide resins as used herein are considered to be polyols. The epoxide resins useful in reacting with acrylic or methacylic acid are those epoxide resins described above. The procedures for preparing these acrylate and methacrylate esters of epoxide resins are described in U.S. Pat. No. 3,377,406 which is hereby incorporated by reference.

The optional acrylate or methacrylate esters of the polyols are blended with the epoxy resin component in a weight ratio of from 0 to up to about 100 parts of ester for each 100 parts of epoxy resin component. In another embodiment, the acrylate or methacrylate esters of the polyols are blended with the epoxy resin component in a weight ratio of about 5 to about 100 parts of ester for each 100 parts of epoxy resin component.

B. Curing Agents

The elastomeric epoxy resin systems of the invention include a curing agent containing at least one monoprimary amine.

Monoprimary Amines

Suitable monoprimary amines for use in the curing agent include monoprimary aliphatic amines containing between about 8 to about 50 carbon atoms, which may optionally contain one or more of ether, thioether or tertiary amine linkages. In one embodiment, the monoprimary amine is represented by the formula:

R—NH$_2$                       Formula 1 wherein in Formula 1, R is a hydrocarbyl group, such as for example an alkyl, alkenyl, alkynyl, cycloalkyl, arylalkyl, hydroxyalkyl, cyanoalkyl, alkylthioalkyl, dialkylaminoalkyl, cyanoarylalkyl, alkoxyarylalkyl, alkylthioarylalkyl and dialkylaminoarylalkyl containing about 8 to about 50 carbon atoms, including any combination or subset thereof.

In another embodiment, the monoprimary amine of Formula 1 may contain an ether, thioether or tertiary amine linkage. In another embodiment the monoprimary amine is represented by any one of the following formulae:

R'—O—R—NH$_2$          Formula 2;

R'S—R—NH$_2$          Formula 3;

R'$_2$N—R—NH$_2$          Formula 4;

R'$_2$P—R—NH$_2$          Formula 5; or

R'$_3$Si—RNH$_2$          Formula 6;

including any combination or subset of Formulae 2 to 6, wherein each R' is independently a hydrocarbyl group, as described above, such that the combination of R plus all R' groups contains a total of between about 8 and about 50 carbon atoms, and in each case, the R and R' groups may be saturated or unsaturated.

In another embodiment, the monoprimary amine is a primary fatty amine, which may optionally include secondary amine groups. Suitable examples of such primary fatty amines include, but are not limited to octylamines, laurylamines, myristylamines, palmitylamines, stearylamines, oleylamine, tallowamines, hydrogenated tallow amines, cetylamines, N-tetradecylamine, cocoamines and soyamines, including any combination or subset thereof.

In another embodiment the monoprimary amine is an amine such as octyl 3-aminopropyl ether, 2-ethylhexyl 3-aminopropyl ether, lauryl 3-aminopropyl ether, myristyl 3-aminopropyl ether, stearyl 3-aminopropyl ether, oleyl 3-aminopropyl ether, behenyl 3-aminopropyl ether and tridecyl 3-amino propyl ether (linear or branched), including any combination or subset thereof.

In one embodiment, the monoprimary amine does not contain cyclic or aromatic groups.

In one embodiment, the monoprimary amine described above is the only curing agent component present in the epoxy resin system. In another embodiment, the monoprimary amine is present such that the ratio of amine hydrogen:epoxy group is between about 0.8 and about 1.2.

Monoprimary Amines in Combination with Amine Terminated Polyamide

In one embodiment, the monoprimary amine is optionally utilized in combination with an amine terminated polyamide which is the reaction product of a dimerized fatty acid or hydrogenated dimerized fatty acid with an amine containing one primary and one secondary amine group or two secondary amine groups. Such diamide-diamines are described in U.S. Pat. Nos. 6,127,508 and 6,500,912 B1, both incorporated herein by reference.

In one embodiment, the amine terminated polyamide is prepared by reacting a carboxylic acid selected from C$_{18}$-C$_{60}$ dicarboxylic acids, C$_{18}$-C$_{60}$ dicarboxylic acid derivatives and mixtures thereof, optionally containing di- or polycarboxylic acids or acid derivatives having from 4 to 20 carbon atoms in an amount ranging from 0-10% based on all carboxylic acids, and at least one amine having the formula:

R$^1$—NH—R$^2$—NH—R$^3$          Formula 7 wherein in Formula 7, R$^1$ has a total number of carbon atoms from 0 to about 20, is selected from the group consisting of hydrogen, alkyl, cycloalkyl, alkenyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl; R$^3$ having a total number of carbon atoms from 1 to about 20, is selected from the group consisting of alkyl, cycloalkyl, alkenyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl; and R$^2$ is (CR$^4$R$^5$)$_n$, wherein n is from 2 to about 20, R$^4$ is independently selected for each (CR$^4$R$^5$) from the group consisting of H, alkyl, aryl, hydroxyl, alkoxy, alkylthio, dialkylamino and cyano; and R$^5$ is independently selected for each (CR$^4$R$^5$) from the group consisting of H, alkyl and aryl.

In another embodiment, the amine terminated polyamide is prepared by the reaction of at least one C$_{18}$-C$_{50}$ dicarboxylic acid, dicarboxylic acid ester or dicarboxylic acid chloride with an aminoalkylpiperazine having the formula:

Formula 8 wherein in Formula 8, R$^1$ is hydrogen and R$^2$ is —R$^3$—NH$_2$ wherein R$^3$ is a divalent aliphatic linkage with optional —CHR$^4$ and —CR$^4$R$^5$ units wherein R$^4$ and R$^5$ are independently alkyl groups. In one embodiment, the divalent linkage group contains about 2 to about 6 carbon atoms.

In one embodiment, the ratio of amine terminated polyamide curing agent:monoprimary amine curing agent is between 0:100 to 99:1. In another embodiment, the ratio of amine terminated polyamide curing agent:monoprimary amine curing agent is between 50:50 to 99:1. In another embodiment, the ratio of amine terminated polyamide curing agent:monoprimary amine curing agent is between 50:50 to 95:5.

Monoprimary Amines in Combination with Diamines or Polyamines

In one embodiment, the monoprimary amine is optionally utilized in combination with a diamine or polyamine containing curing agent.

In another embodiment, the monoprimary amine is optionally used in combination with an amine-containing curing agent. Amine-containing curing agents have, on average, more than one active hydrogen atom, wherein the active hydrogen atoms may be bonded to the same nitrogen atom or to different nitrogen atoms. Such curing agents include those compounds that contain a primary amine moiety, and compounds that contain two or more primary or secondary amine or amide moieties linked to a common central organic moiety. Suitable examples include, but are not limited to ethylene diamine, diethylene triamine, polyoxypropylene diamine, triethylene tetramine, dicyandiamide, melamine, cyclohexyl amine, benzylamine, diethylaniline, methylenedianiline, m-phenylenediamine, diaminodiphenylsulfone, 2,4 bis(p-aminobenzyl)aniline, and the like, and soluble adducts of amines and polyepoxides and their salts, such as described in U.S. Pat. Nos. 2,651,589 and 2,640,037.

In another embodiment, the monoprimary amine is optionally used in combination with a polyamidoamine curing agent. Polyamidoamines are typically the reaction product of a polyacid and an amine. Examples of polyacids used in making these polyamidoamines include 1,10-decanedioic acid, 1,12-dodecanedioic acid, 1,20-eicosanedioic acid, 1,14-tetradecanedioic acid, 1,18-octadecanedioic acid and dimerized and trimerized fatty acids. Amines used in making the polyamidoamines include aliphatic and cycloaliphatic polyamines such as ethylene diamine, diethylene triamine, triethylene tetramine, tetraethylene pentamine, 1,4-diaminobutane, 1,3-diaminobutane, hexamethylene diamine, and the like. In another embodiment, polyamides are those derived from the aliphatic polyamines containing no more than 12 carbon atoms and polymeric fatty acids obtained by dimerizing and/or trimerizing ethylenically unsaturated fatty acids containing up to 25 carbon atoms.

In another embodiment, the monoprimary amine is optionally used in combination with curing agents such as aliphatic polyamines, polyglycoldiamines, polyoxypropylene diamines, polyoxypropylenetriamines, amidoamines, imidazoles, reactive polyamides, ketimines, araliphatic polyamines (i.e. xylylenediamine), cycloaliphatic amines (i.e. isophoronediamine or diaminocyclohexane), menthane diamine, 4,4-diamino-3,3-dimethyldicyclohexylmethane, heterocyclic amines (aminoethyl piperazine), aromatic polyamines (methylene dianiline), diamino diphenyl sulfone, mannich base, phenalkamine, N,N',N''-tris(6-aminohexyl)melamine, and the like.

In one embodiment, the ratio of diamine or polyamine containing curing agent:monoprimary amine curing agent is between 0.01:1 to about 1:1.

In another embodiment, when the monoprimary amine is optionally utilized in combination with a diamine or polyamine containing curing agent the amount of diamine or polyamine is less than about 15 wt %, based upon the weight of the curing agent mixture.

In another embodiment, when the monoprimary amine is optionally utilized in combination with a diamine or polyamine containing curing agent the diamine or polyamine contains an average of less than 3 active hydrogen atoms.

C. Accelerators

The composition may also optionally comprise an accelerator known to be compatible with amine-functional groups. Examples include sulfonates such as alkylbenzenesulfonates, phosphonates, sulfates, tetrafluoroborates, carboxylates and nitrates of Groups IA, IIA and transition metals of the Periodic Table (CAS version), preferably Mg, Ca, and Sn (II) salts and complexes. Other examples of accelerators include inorganic acids such as $HBF_4$, $H_2SO_4$, $H_2NSO_3H$, and $H3PO4$, carboxylic acids, particularly hydroxyl-group containing carboxylic acids such as salicylic acid, lactic acid, glycolic acid and resorcylic acid; phenolic compounds such as phenol, t-butylphenol, nonylphenol and BPA; imidazoles; cyanamide compounds such as dicyandiamide and cyanamide; sulfonamides such as p-toluenesulfonamide; and imides such as phthalimide, succinimide, maleimide, perylenetetracarboxylic diimide, and saccharin. In one embodiment, accelerators useful for the present invention include, but are not limited to calcium nitrate, calcium alkylbenzene sulfonates, magnesium alkanesulfonates, dicyandiamide, tetrafluoroboric acid, salicylic acid, phenol, dichloroacetic acid, trifluoroacetic acid, thiocyanic acid and mercaptoacetic acid. In another embodiment, the ammonium, calcium or magnesium salt of an acid may be used in place of the acids themselves.

The amount of optional accelerator will vary depending upon the particular curing agent used (due to cure chemistry and curing agent equivalent weight) and may be readily determined by one of ordinary skill in the art. In one embodiment, the accelerator is typically used in an amount of about 5 wt % or less, based upon the total weight of the curing agent.

D. Compositions

In one embodiment, the Brookfield viscosity of the curing agent containing the monoprimary amine, as measured at 25° C., is about 3000 cP or less.

In one embodiment, the $T_g$ of the fully cured resin composition, as measured by Differential Scanning calorimetry (DSC), is 30° C. or less. In another embodiment, the $T_g$ of the fully cured resin composition, as measured by DSC, is 15° C. or less.

In one embodiment, the tensile strength of the fully cured resin composition, as measured by ASTM D-638 at 25° C., is greater than 1 MPa. In another embodiment, the tensile strength of the fully cured resin composition, as measured by ASTM D-638 at 25° C., is greater than 2 MPa.

In one embodiment, the elongation of the fully cured resin composition, as measured by ASTM D-638 at 25° C., is greater than 100%. In another embodiment, the elongation of the fully cured resin composition, as measured by ASTM D-638 at 25° C., is greater than 200%. In another embodiment, the elongation of the fully cured resin composition, as measured by ASTM D-638 at 25° C., is between about 100% and about 200%.

In one embodiment, the cured product may contain some uncrosslinked fraction (leading to partial meltability) but will generally be at least primarily crosslinked. In another embodiment, a substoichiometric ratio of amine to epoxy groups may be used in order to promote some epoxy homopolymerization and resultant crosslinking. In another embodiment, the cured product may be almost completely uncrosslinked, such that it is soluble in a solvent.

In another embodiment, the fully cured epoxy resin system contains a sufficiently high amount of cross-linkage such that the resin does not fully dissolve in any solvent. In another embodiment, the fully cured resin composition is essentially free of asphalt.

In order to provide a better understanding of the present invention including representative advantages thereof, the following examples are offered. It is understood that the examples are for illustrative purposes and should not be regarded as limiting the scope of the invention to any specific materials or conditions.

EXAMPLES

The glass transition temperature ($T_g$) of the cured resins in these Examples was measured by Differential Scanning calorimetry (DSC) at a heat-up rate of 20° C./minute from 50° C. to 220° C. followed by rapid cooling and a second identical heating rate scan. The midpoint of the curve in which heat capacity ($C_p$) increases from the glassy plateau to the rubbery plateau was take as the $T_g$. The DSC instrument utilized was a TA Instruments DSC Model Q20 and its temperature was calibrated using an indium and a tin standard.

The tensile strength, tensile modulus, and the tensile elongation of the cured resins in these Examples were measured by ASTM D-638 at a strain rate of 2 inches per minute. The tensile strength was determined as the maximum value in the stress-strain curve.

The viscosity of the curing agents in these Examples is the Brookfield viscosity measured at 25° C.

Example 1

Cure of EPON Resin 828 with Different Monoamines (and One Diamine)

EPON Resin 828 was blended at room temperature with essentially stoichiometric amounts of different monoamines (and one amine containing one primary and one secondary amine group) in small polypropylene beakers by stirring until homogeneous. The mixtures were then cured in the beakers for 1 hour at 60° C. and then for 1.5 hours at 100° C. The castings were removed from the beakers and tested for glass transition temperature by Differential Scanning calorimetry (DSC). The physical appearance and feel of each casting was noted. Results are shown in Table 1 below.

TABLE 1

Cure of EPON Resin 828 with Various Monoamines and One Diamine

| Amine | Amine hydrogen equivalent weight | EPON Resin 828, grams | Amine, grams | $T_g$ (midpoint by DSC) | Appearance of casting |
|---|---|---|---|---|---|
| 2-Aminoethanol, parts | 30.54 | 8.6 | 1.4 | 72.16 | Hard, brittle |
| N-(3-aminopropyl)morpholine, parts | 72.1 | 7.2 | 2.8 | 61.89 | Hard, somewhat tough |
| CORSAMINE[1] PCD, parts (coconut-derived distilled fatty monoamine) | 96 | 6.6 | 3.4 | 21.09 | Hard, very tough |
| CORSAMINE PO, parts (oleylamine) | 135 | 5.8 | 4.2 | 7.58 | Rubbery |
| TOMAMINE[2] PA-12 EH, parts (3-(2-ethylhexyloxy)propylamine) | 96.4 | 6.6 | 3.4 | 12.28 | Rubbery |
| TOMAMINE PA-17, parts (3-(branched tridecyloxy)propylamine) | 130.5 | 5.9 | 4.1 | 12.06 | Rubbery |
| CORSAMINE DO, parts (3-(oleylamino)propylamine) | 109.8 | 6.3 | 3.7 | 31.4 | Hard, tough |

[1] CORSAMINE amines are commercially available from Corsicana Technologies, Inc.
[2] TOMAMINE amines are commercially available from Air Products A number of the cured mixtures, including the one cured with CORSAMINE PO, appeared to be melted at 100° C. and a thread could be drawn from the melt with a stick. However, when the mixtures were cooled to room temperature, they became tough rubbery or hard plastic materials.

The results above illustrate the tough rubbery or tough hard plastic nature of EPON Resin 828 cured with a number of the monoamines, particularly in the 12-22 carbon chain length range.

Example 2

Cure of EPON Resin 828 with Different Long-Chain Monoamines at Different Stoichiometric Ratios Mixtures of EPON Resin 828 were prepared with a distilled oleylamine (CORSAMINE POD), a distilled monoamine derived from coconut fatty acid (CORSAMINE PCD), 3-(2-ethylhexyloxy)propylamine (TOMAMINE PA-12EH) and crystalline solid octadecylamine. The blends with the three first amines (which were liquids) were prepared at room temperature by simple hand mixing and then degassed in a centrifuge. The blends with the crystalline solid octadecylamine were prepared by melting the amine, mixing similarly with EPON Resin 828 and then degassing in a centrifuge. Castings ⅛" (3.175 mm) thick were prepared by pouring the mixtures into molds made from two sheets of glass (previously treated with a mold release agent) and curing overnight at room temperature and then for 4 hours at 60° C. and 2 hours at 100° C. The castings were tested for solubility in tetrahydrofuran (THF) at room temperature. Those insoluble in THF at room temperature were then tested for solubility in 1,3-diisopropylbenzene (DIPB) at 140° C. Those insoluble in DIPB at 140° C. were then tested for solubility at 140° C. in a 2:1 mixture of DIPB with N-methylpyrrolidone (NMP). Specimens from the castings were put in a 150° C. oven and their ability to flow at this temperature was determined. Molecular weights of the soluble cured castings (or of the THF-soluble material, if the casting was not completely soluble) were determined by gel permeation chromatography (GPC) with a UV absorption detector at 254 nm wavelength. Bars for tensile testing were cut from the castings and tensile properties were determined (ASTM D-638). Results are shown in Tables 2A through 2D below.

TABLE 2A

Cure of EPON Resin 828 with Distilled Oleylamine (CORSAMINE POD)

| Casting #26932- | 133-1 | 143-1 | 133-2 | 143-2 | 133-3 |
|---|---|---|---|---|---|
| NH/epoxy ratio | 0.75 | 0.875 | 1 | 1.125 | 1.25 |
| EPON Resin 828, grams | 100 | 122.5 | 100 | 110.4 | 100 |
| Corsamine POD, grams | 54.1 | 77.5 | 72.2 | 89.6 | 90.2 |
| Casting appearance | Tacky, flowing; became hard and tough after a few days | Self-adherent but retracts after deformation | Nontacky, flexible | Tacky, flowing | Tacky, flowing |
| Completely soluble in THF at 25° C.? | Yes | No | No | Yes | Yes |
| Completely soluble in DIPB at 140° C.? |  | Yes | Yes |  |  |
| Flow at 150° C.? | Yes |  | Questionable |  | Yes |
| GPC, Mn | 1523 | 1297 | 3167 (a) | 3380 | 4269 |
| GPC, Mw | 3785 | 6051 | 13495 (a) | 11916 | 7912 |
| GPC, Mz | 5786 | 11505 | 25044 (a) | 19989 | 11960 |
| Tensile strength, MPa |  |  | 6.21 |  |  |
| Tensile modulus, MPa |  |  | 1.62 |  |  |
| Tensile elongation, % |  |  | 869 |  |  |

(a) GPC data for the portion of the cured casting which was soluble in THF at room temperature

TABLE 2B

Cure of EPON Resin 828 with Distilled Coconut Fatty Amine (Corsamine PCD)

| Casting #26932- | 143-5 | 143-6 | 143-7 |
|---|---|---|---|
| NH/epoxy ratio | 0.875 | 1 | 1.125 |
| EPON Resin 828, grams | 126.7 | 122.5 | 110.4 |
| Corsamine POD, grams | 54.1 | 77.5 | 89.6 |
| Casting appearance | Flexible but easily broken | Flexible, tough | Self-adherent; somewhat flowing; brittle at low temp. |
| Completely soluble in THF at 25° C.? | No | Yes | Yes |
| Completely soluble in DIPB at 140° C.? | Yes | | |
| GPC, Mn | 1441 | 4642 | 5473 |
| GPC, Mw | 5451 | 14605 | 12404 |
| GPC, Mz | 9950 | 28395 | 20085 |
| Tensile strength, MPa | 5.83 | 13.7 | 0.24 |
| Tensile modulus, MPa | 114.3 | 15.0 | 18.8 |
| Tensile elongation, % | 392 | 608 | 277 |

TABLE 2C

Cure of EPON Resin 828 with 3-(2-ethylhexyloxy)propylamine (Tomamine PA-12 EH)

| Casting #26932- | 133-4 | 143-3 | 133-5 | 143-4 | 133-6 |
|---|---|---|---|---|---|
| NH/epoxy ratio | 0.75 | 0.875 | 1 | 1.125 | 1.25 |
| EPON Resin 828, grams | 100 | 137.8 | 100 | 126.6 | 100 |
| Tomamine PA-12 EH, grams | 38.7 | 62.2 | 51.6 | 73.4 | 64.4 |
| Casting appearance | Tacky, flowing; became hard and tough after a few days | Nontacky, retracts after deformation | Nontacky, flexible | Tacky, flowing | Tacky, flowing |
| Completely soluble in THF at 25° C.? | Yes | Yes | No | Yes | Yes |
| Completely soluble in DIPB at 140° C.? | | | No | | |
| Completely soluble in 2:1 DIPB:NMP at 140° C.? | | | Yes | | |
| Flow at 150° C.? | Yes | | Questionable | | Yes |
| GPC, Mn | 1477 | 1625 | 2576 (a) | 4741 | 2965 |
| GPC, Mw | 3987 | 5555 | 10325 (a) | 13326 | 7619 |
| GPC, Mz | 6513 | 10323 | 19292 (a) | 23994 | 12743 |
| Tensile strength, MPa | | | 0.065 | 3.54 | |
| Tensile modulus, MPa | | | 9.93 | 1.00 | |
| Tensile elongation, % | | | 2305 (b) | 685 | |

(a) GPC data for the portion of the cured casting which was soluble in THF at room temperature
(b) High tensile elongation value showed flow with little retractive force (apparent modulus dropping dramatically after the initial application of force). This is seen in the extremely low tensile strength of this sample.

TABLE 2D

Cure of EPON Resin 828 with Octadecylamine (Aldrich)

| Casting #26932- | 133-7 | 133-8 | 133-9 |
|---|---|---|---|
| NH/epoxy ratio | 0.75 | 1 | 1.25 |
| EPON Resin 828, grams | 100 | 100 | 100 |
| Octadecylamine, grams | 54.1 | 72.2 | 90.2 |
| Casting appearance | Tacky, flowing; became brittle after a few days | Nontacky, flexible | Tacky, flowing; became brittle after a few days |
| Completely soluble in THF at 25° C.? | Yes | Yes | Yes |
| Flow at 150° C.? | Yes | Yes | Yes |
| GPC, Mn | 1454 | 10626 | 3685 |
| GPC, Mw | 4371 | 23115 | 6788 |
| GPC, Mz | 7135 | 34135 | 9899 |
| Tensile strength, MPa | | 3.85 | |
| Tensile modulus, MPa | | 0.922 | |
| Tensile elongation, % | | 724 | |

From the tables above one can see that the castings which were significantly off stoichiometric balance (with an amine/epoxy ratio less than or equal to 0.875 or greater than or equal to 1.125) generally tended to be tacky, self-adherent and sometimes flowing. The amine-rich castings tended to retain this adhesiveness and flowability with time. By contrast, some of the epoxy-rich castings (26932-133-1, -133-4 and -133-7) tended to become hard and tough (or in the case of the octadecylamine casting, brittle) after standing for several days or weeks, possibly due to slow polymerization of the residual epoxy groups. The castings at stoichiometric balance were typically strong and flexible with extremely high elongation values typical of rubbers.

All of the as-prepared castings were soluble in some solvent, showing the absence of crosslinking. Most were soluble in THF at 25° C., with all of the others being soluble either in DIPB or in a DIPB/NMP mixture at 140° C. GPC results generally showed that molecular weight was maximum at an NH/epoxy ratio of 1, as would be expected. The higher molecular weight may have given some tenacity (and resistance to flow) to these castings in the absence of crosslinking. Three of the epoxy-rich castings (26932-133-1, -133-4 and -133-7), which were soft and tacky after the initial cure cycle but became hard and tough after standing at room temperature for 6 weeks, were tested again for solubility after this time. By then they had become insoluble in THF at room temperature and were also insoluble in DIPB or DIPB/NMP at 140° C. These solubility results suggested that these epoxy-rich castings had indeed become crosslinked on standing.

The off-stoichiometric castings made with octadecylamine (Table 2D), which were initially soft and tacky, tended to become brittle (though still soft) and translucent (rather than transparent as they initially were) upon standing at room temperature. This embrittlement may have been caused by wax-type crystallization of the linear saturated hydrocarbon chains of the octadecylamine. The casting made with octadecylamine at stoichiometric balance did not seem to have this problem, perhaps because the higher molecular weight and viscosity made side-chain crystallization more difficult. The results were particularly surprising given the poor properties claimed in Example 1 of U.S. Pat. No. 2,915,485 for a casting of stoichiometrically equivalent amounts of octadecylamine and a resin similar to EPON Resin 828. In that prior art example, the casting was claimed to be very weak and easily shattered under impact—differing completely from the behavior of materials of the invention prepared from octadecylamine and similar monoamines.

Example 3

Cure of EPON Resin 828 (Optionally Diluted with Neopentyl Glycol Diacrylate) with Distilled Oleylamine (CORSAMINE POD) and an Optional Crosslinker Blends of EPON Resin 828 (optionally diluted with neopentyl glycol diacrylate, NPGDA) with a distilled oleylamine (CORSAMINE POD) and an optional crosslinker (Jeffamine D-400, a poly(propylene oxide) diamine with a molecular weight of approximately 400) were prepared in paper gel time cups by hand-mixing rapidly at room temperature (or at slightly elevated temperature when indicated) with a tongue depressor. Except where noted, the resins and curing agents were mixed in approximate stoichiometric balance (one amine hydrogen atom per epoxy group). The cups were then placed into a Shyodu gel timer set at the indicated temperature with a rotating probe. The elapsed time at which probe rotation stopped was taken as the gel time. Results are shown in Table 3 below.

Castings were also prepared by pouring the mixture into a mold made from two sheets of glass (previously treated with a mold release agent) and curing overnight at room temperature and then for 4 hours at 60° C. and 2 hours at 100° C. Bars for tensile testing were cut from the castings and tensile properties were determined (ASTM D-638). Results are shown in Table 3 below.

From Table 3 above one can note that a number of the cured castings have extremely high elongation values, values which are typical of commercial vulcanized and thermoplastic rubbers rather than of prior art flexible epoxies (which typically have tensile elongation values in the 100% range). Combinations of tensile properties are shown relative to prior art epoxies in FIG. 1. Casting 97-3 in Table 3 above would partially "melt" and form a bond to an aluminum surface when heated to 200° C. The bond became strong when the material was cooled to room temperature. The casting would not completely dissolve in THF at room temperature but would completely dissolve in DIPB at 140° C., indicating that crosslinking was not present.

Example 4

Accelerated Cure of EPON Resin 828 (Diluted with Trimethylolpropane Triacrylate (TMPTA) or Neopentyl Glycol Diacrylate (NPGDA)) with Distilled Oleylamine (CORSAMINE POD) and an Optional Crosslinker To a 2-liter glass round bottom flask (fitted with a paddle stirrer) were added 50 grams of ammonium tetrafluoroborate and 450 grams of CORSAMINE POD (distilled oleylamine). The mixture was heated to 50-60° C. and stirred for one hour in this temperature range to dissolve the ammonium tetrafluoroborate. The solution (26932-100) was filtered to remove a small amount of insoluble material and then used as a masterbatch for introducing the ammonium tetrafluoroborate accelerator into the following curing compositions.

Blends of EPON Resin 828 (diluted with trimethylolpropane triacrylate (TMPTA) or neopentyl glycol diacrylate (NPGDA)) with a distilled oleylamine (CORSAMINE POD) and an optional crosslinker (Jeffamine D-400, a poly(propylene oxide) diamine with a molecular weight of approximately 400) and ammonium tetrafluoroborate accelerator (introduced as the above solution in CORSAMINE POD) were prepared in paper gel time cups by hand-mixing rapidly at room temperature (or at slightly elevated temperature when indicated) with a tongue depressor. Except where noted, the resins and curing agents were mixed in approximate stoichiometric balance (one amine hydrogen atom per epoxy group). The cups were then placed into a Shyodu gel timer set at the indicated temperature with a rotating probe. The elapsed time at which probe rotation stopped was taken as the gel time. Results are shown in Table 4 below.

TABLE 3

Cure of EPON Resin 828 (optionally diluted with neopentyl glycol diacrylate (NPGDA)) with distilled oleylamine (CORSAMINE POD) and an optional crosslinker (Jeffamine D-400)

| Expt. # 26932- | EPON Resin 828, parts | NPGDA, parts | Corsamine POD, parts | Jeffamine[3] D-400, parts | Gel time, 50° C. start (not thermostatted) | Tensile strength, MPa | Tensile modulus, MPa | Tensile elong., % |
|---|---|---|---|---|---|---|---|---|
| 97-3 | 58 |  | 42 |  | 345' 18" | 2.89 | 0.431 | 1203 |
| 99-1 | 59.3 |  | 34.6 | 6.1 |  | 4.73 | 1.41 | 606 |
| 99-2 | 60.5 |  | 27.6 | 11.9 |  | 5.42 | 1.91 | 379 |
| 97-2 | 51 | 5.7 | 43.3 |  | 688' 03" | 0.089 | 0.538 | 1533 |
| 99-3 | 52.2 | 5.8 | 35.7 | 6.3 |  | 2.05 | 0.607 | 460 |
| 99-4 | 53.3 | 5.9 | 28.6 | 12.2 |  | 1.72 | 0.780 | 278 |

[3]JEFFAMINE amines are commercially available from Huntsman Corporation

TABLE 4

Cure of EPON Resin 828 (diluted with trimethylolpropane triacrylate (TMPTA) or neopentyl glycol diacrylate (NPGDA)) with distilled oleylamine (CORSAMINE POD) and an optional crosslinker (Jeffamine D-400) accelerated with ammonium tetrafluoroborate

| Expt. # 26932- | EPON Resin 828, parts | TMPTA, parts | NPGDA, parts | Corsamine POD, parts | Jeffamine D-400, parts | $NH_4BF_4$, parts | Gel time, 50° C. start (not thermostatted) |
|---|---|---|---|---|---|---|---|
| 103-8 | 51.2 | 5.1 |     | 43.7 |      | 1.0 | 59' 39" |
| 103-7 | 44.3 | 10.2 |    | 45.5 |      | 1.0 | 18' 27" |
| 102-5 | 52.2 |      | 5.8 | 35.7 | 6.3  | 1.0 | 33' 47" |
| 102-6 | 53.3 |      | 5.9 | 28.6 | 12.2 | 1.0 | 45' 22" |

From the results in Table 4 above one can see that addition of approximately 1% of ammonium tetrafluoroborate accelerator, based on the weight of the total system, dramatically shortens gel times for cure with the monoamine or monoamine-diamine mixtures in comparison with similar but unaccelerated systems in Table 3.

Comparative Example 5

Cure of EPON Resin 828 (Optionally Diluted With Trimethylolpropane Triacrylate) with a Standard Flexibilizing Curing Agent (Jeffamine D-2000) Blended with a Small Amount of a Low-Viscosity Monoprimary Amine (N-(3-aminopropyl)morpholine)

Blends of EPON Resin 828 (optionally diluted with trimethylolpropane triacrylate, TMPTA) with a standard "flexible" curing agent (Jeffamine D-2000, a poly(propylene oxide) diamine with a molecular weight of approximately 2000) blended with a small amount of a low-viscosity monoamine (N-(3-aminopropyl)morpholine, APM) were prepared in paper gel time cups by hand-mixing rapidly at room temperature (or at slightly elevated temperature when indicated) with a tongue depressor. Except where noted, the resins and curing agents were mixed in approximate stoichiometric balance (one amine hydrogen atom per epoxy group). The cups were then placed into a Shyodu gel timer set at the indicated temperature with a rotating probe. The elapsed time at which probe rotation stopped was taken as the gel time. Results are shown in Table 5 below.

Castings were also prepared by pouring the mixture into a mold made from two sheets of glass (previously treated with a mold release agent) and curing overnight at room temperature and then for 4 hours at 60° C. and 2 hours at 100° C. Bars for tensile testing were cut from the castings and tensile properties were determined (ASTM D-638). Results are shown in Table 5 below.

Gel times of these systems, as can be seen from Table 5, were extremely long, with very poor cure speed at room temperature compared with the invention compositions. Also, the combinations of tensile strength and elongation were relatively poor compared to the invention compositions (cf. FIG. 1 in Example 7).

Example 6

Preparation of a Condensate (26932-85) of N-(2-aminoethyl)piperazine (AEP) with Dimerized Fatty Acid (AEP-Dimer Condensate), Blending with Monofunctional Amines, and Use of a Number of the Mixtures of AEP-Dimer Condensate and Monofunctional Amines to Cure Epoxy Resins and Their Mixtures with Multifunctional Acrylate Esters In a 4-neck, 5-liter round bottom flask fitted with a paddle stirrer and a distillation takeoff were mixed 1824 grams of N-(2-aminoethyl)piperazine (AEP) and 1976 grams of dimerized fatty acid (Unidyme 18, Arizona Chemical). Heating was started at atmospheric pressure with stirring. Distillation of a mixture of reaction water and excess AEP started at 169° C. When the pot temperature reached 225° C. (after about 1½ hours of heating), the atmospheric pressure distillate was drained from the receiver and vacuum was applied to distill the remaining unreacted AEP. In about 45 minutes of further heating, the temperature was raised to 235° C. and the pressure was gradually dropped to about 800-1000 Pa. The pressure was kept in this range for about 20 minutes until distillation stopped. The final residual product in the pot had an amine nitrogen equivalent weight of 213 (corresponding to an amine hydrogen equivalent weight of approximately 400) and a Brookfield viscosity of 194.6 Pa-s (194600 cP) at 25° C. and of 27 Pa-s (27000 cP) at 40° C. The product is referred to as "AEP-dimer condensate".

Blending experiments were carried out with the AEP-dimer condensate and a number of monoprimary aliphatic amines. The AEP-dimer condensate and monoprimary

TABLE 5

Cure of EPON Resin 828 (optionally diluted with trimethylolpropane triacrylate (TMPTA)) with a long-chain flexibilizing poly(propylene oxide) diamine (Jeffamine D-2000) blended with a small amount of a low-viscosity monoamine (N-(3-aminopropyl)morpholine, APM)

| Expt. # 26932- | EPON Resin 828, parts | TMPTA, parts | Jeffamine D-2000, parts | APM, parts | Gel time, 50° C. start (not thermostatted) | Tensile strength, MPa | Tensile modulus, MPa | Tensile elong., % |
|---|---|---|---|---|---|---|---|---|
| 92-2 (98-2) | 41   |      | 50.1 | 8.9 | Ungelled after 4328 minutes | 1.85  | 1.86  | 160 |
| 92-1 (98-1) | 20.4 | 13.6 | 56.1 | 9.9 | 2464' 07"                   | 0.598 | 0.877 | 90  | amine were mixed (with slight heating as necessary) until homogeneous and 25° C. Brookfield viscosity was determined. Results are shown in Table 6A below (indicating the very strong ability of the monoprimary amines to lower the viscosity of the AEP-dimer condensate).

decreases as tensile elongation increases in the systems. One can see from FIG. 1, however, that the prior art systems, with one exception (828/AEP-dimer condensate), generally fall well below and/or to the left of the curve of the systems having a combination of the highest tensile strength and

TABLE 6A

Blending of AEP-dimer condensate with various monoprimary amines and viscosity determination of blends

| Experiment 26932-90- | 1 | 2 | 10 | 3 | 9 | 7 | 4 | 8 | 11 | 5 |
|---|---|---|---|---|---|---|---|---|---|---|
| AEP-dimer condensate, grams | 16 | 14 | 17 | 16 | 15 | 16 | 16 | 15 | 15 | 14 |
| SURFONAMINE[4] B-30, g (1) | 4 | 6 | | | | | | | | |
| 3-Aminopropyl-morpholine, grams | | | 3 | 4 | 5 | | | | | |
| 2-Aminoethanol, g | | | | | | 4 | | | | |
| ARMEEN[5] OL, g | | | | | | | 4 | 5 | | 6 |
| Corsamine PO, g | | | | | | | | | 5 | |
| 25° C. Brookfield viscosity, mPa-s (cP) | 8125 | 2625 | 8075 | 4220 | 2115 | 6963 | 5463 | 3000 | 3105 | 1825 |

[4]SURFOAMINE amines are commercially available from Hunstman Corporation
[5]ARMEEN amines are commercially available from Akzo Nobel Blends for gel time tests were prepared in paper gel time cups (as in Example 3) by hand-mixing rapidly at room temperature (or at slightly elevated temperature when indicated) with a tongue depressor. Except where noted, the resins and curing agents were mixed in approximate stoichiometric balance (one amine hydrogen atom per epoxy group or acrylate double bond). The cups were then placed into a Shyodu gel timer set at the indicated temperature with a rotating probe. The elapsed time at which probe rotation stopped was taken as the gel time. Results are shown in Table 6B below.

Castings were also prepared by pouring the mixture into a mold made from two sheets of glass (previously treated with a mold release agent) and curing overnight at room temperature and then for 4 hours at 60° C. and 2 hours at 100° C. Bars for tensile testing were cut from the castings and tensile properties were determined (ASTM D-638). Results are shown in Table 6B below.

highest elongation. These prior art systems include 1) a commercial membrane system (based on a diluted bisphenol A epoxy resin cured with an amine adduct of a glycidated poly(propylene oxide) as disclosed in U.S. Pat. No. 6,127,508, FIG. 1, plot symbol "C", a diglycidyl ester of a dimerized fatty acid cured with isophoronediamine, EPON Resin 828 cured with a commercial "dimer diamine" produced by making the dinitrile from a dimer acid followed by hydrogenation as disclosed in U.S. Pat. No. 6,500,912, FIG. 1, plot symbol "K", EPON Resin 828 cured with a condensate of N-(2-aminoethyl)piperazine and dimerized fatty acid ("AEP-dimer condensate") as disclosed in U.S. Pat. No. 6,127,508, FIG. 1, plot symbol "E" and two systems cured predominantly with Jeffamine D-2000 (from Comparative Example 5). The only prior art system rivaling the invention systems in balance of tensile properties was that based on EPON Resin 828 cured with AEP-dimer condensate (similar to the material made in Example 6). As noted in Example 6,

TABLE 6B

Cure of EPON Resin 828 (optionally diluted with trimethylolpropane triacrylate (TMPTA) or neopentyl glycol diacrylate (NPGDA)) with AEP-dimer condensate blended with oleylamine (CORSAMINE PO) or N-(3-aminopropyl)morpholine (APM)

| Expt. # 26932-94- | EPON Resin 828, parts | TMPTA, parts | NPGDA, parts | AEP-dimer condensate, parts | Corsamine POD, parts | APM, parts | Gel time, 50° C. start (not thermostatted) | Tensile strength, MPa | Tensile modulus, MPa | Tensile elong., % |
|---|---|---|---|---|---|---|---|---|---|---|
| 2-A | 41.7 | | | 43.7 | 14.6 | | | 26.2 | 258 | 378 |
| 1-A | 21 | 14 | | 48.8 | 16.2 | | 4' 01" | 1.37 | 0.405 | 517 |
| 3-A | 36.4 | | 4 | 44.7 | 14.9 | | 50' 03" | 9.98 | 3.24 | 670 |
| 2-B | 49.0 | | | 39.8 | | 11.2 | | 49.7 | 1229 | 59 |
| 1-B | 25 | 16.7 | | 45.5 | | 12.8 | 3' 33" | 1.17 | 0.554 | 296 |
| 3-B | 42.7 | | 4.8 | 41.0 | | 11.5 | 28' 29" | 34.8 | 856 | 134 |

Example 7

Comparison of Tensile Data for Systems from Examples 2-6 with Prior Art Systems

FIG. 1 is a plot of tensile elongation versus tensile strength for systems described in the above examples versus a number of prior art systems (including those in Comparative Example 5). Optimum properties are in the upper right of the graph. Tensile strength, in the normal pattern, however, the AEP-dimer condensate is extremely high in viscosity and hence EPON Resin 828 cured with AEP-dimer condensate is also very high in viscosity (and deficient in processability) compared with the invention systems. This high viscosity significantly limits commercial applications.

While the present invention has been described and illustrated by reference to particular embodiments, those of ordinary skill in the art will appreciate that the invention lends itself to variations not necessarily illustrated herein.

For this reason, then, reference should be made solely to the appended claims for purposes of determining the true scope of the present invention.

We claim:

1. A composition comprising an epoxy resin system, the epoxy resin system comprising a reaction product of:
   an epoxy resin component; and
   a curing agent comprising:
      a monoprimary amine represented by any one of the formulae R'—O—R—NH$_2$, R'S—R—NH$_2$, R'$_2$N—R—NH$_2$, R'$_2$P—R—NH$_2$, or R'$_3$Si—RNH$_2$ wherein each of R or R' is independently a hydrocarbyl group such that a combination of R plus all R' groups contains a total of between about 8 and about 50 carbon atoms; and
      an adduct of a polyepoxide and a compound having two or more primary amine moieties linked to a common central organic moiety;
   wherein when cured, the reaction product of the epoxy resin component and the curing agent exhibits a tensile strength of >1 MPa, and an elongation of >100% as measured by ASTM D-368 at 25° C.

2. The composition of claim 1 wherein the curing agent further comprises an amine terminated polyamide which is the reaction product of a dimerized fatty acid or hydrogenated dimerized fatty acid with an amine containing one primary and one secondary amine group or two secondary amine groups.

3. The composition of claim 2 wherein the amine terminated polyamide is prepared by reacting:
   (a) carboxylic acids selected from C$_{18}$-C$_{60}$ dicarboxylic acids, C$_{18}$-C$_{60}$ dicarboxylic acid derivatives and mixtures thereof, wherein the carboxylic acids optionally contain di- or polycarboxylic acids or acid derivatives having from 4 to 20 carbon atoms in an amount ranging from 0-10% based on all carboxylic acids; and
   (b) at least one amine having the formula:

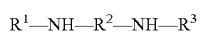

R$^1$—NH—R$^2$—NH—R$^3$ wherein R$^1$ has a total number of carbon atoms from 0 to about 20 and is selected from the group consisting of hydrogen, alkyl, cycloalkyl, alkenyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl;
   R$^3$ has a total number of carbon atoms from 1 to about 20 and is selected from the group consisting of alkyl, cycloalkyl, alkenyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl; and
   R$^2$ is (CR$^4$R$^5$)$_n$, wherein n is from 2 to about 20, R$^4$ is independently selected for each (CR$^4$R$^5$) from the group consisting of H, alkyl, aryl, hydroxyl, alkoxy, alkylthio, dialkylamino and cyano; and R$^5$ is independently selected for each (CR$^4$R$^5$) from the group consisting of H, alkyl and aryl.

4. The composition of claim 2 wherein the amine terminated polyamide is prepared by reacting:
   at least one C$_{18}$-C$_{50}$ dicarboxylic acid, dicarboxylic acid ester or dicarboxylic acid chloride with an aminoalkylpiperazine having the formula:

wherein R$^1$ is hydrogen and R$^2$ is —R$^3$—NH$_2$ wherein R$^3$ is a divalent aliphatic linkage with optional —CHR$^4$ and —CR$^4$R$^5$ units, wherein R$^4$ and R$^5$ are independently alkyl groups.

5. The composition of claim 1 wherein the monoprimary amine is represented by the formula R'—O—R—NH$_2$ wherein each of R or R' is independently a hydrocarbyl group such that a combination of R plus R' contains a total of between about 8 and about 50 carbon atoms.

6. The composition of claim 1 wherein the monoprimary amine is represented by the formula R'$_2$N—R—NH$_2$ wherein each of R or R' is independently a hydrocarbyl group such that a combination of R plus both R' groups contains a total of between about 8 and about 50 carbon atoms.

7. The composition of claim 1 wherein the compound having two or more primary amine moieties linked to a common central organic moiety may comprise an amine compound selected from the group consisting of aliphatic polyamines, cycloaliphatic polyamines, polyglycoldiamines, polyoxypropylene diamines, polyoxypropylenetriamines, araliphatic polyamines, heterocyclic amines, aromatic polyamines, and combinations thereof, having two or more primary amine moieties linked to a common central organic moiety.

8. The composition of claim 1 wherein the epoxy resin system further comprises a monofunctional or polyfunctional epoxy diluent.

9. The composition of claim 1 wherein the epoxy resin system further comprises a polyacrylate or polymethacrylate ester of a polyol.

10. The composition of claim 1 wherein the epoxy resin system further comprises an accelerator.

11. The composition of claim 10 wherein the accelerator comprises a compound selected from the group of alkylbenzenesulfonates, phosphonates, sulfates, tetrafluoroborates, carboxylates and nitrates of Groups IA, IIA and transition metals of the Periodic Table, inorganic acids, carboxylic acids, phenolic compounds, imidazoles, cyanamide compounds, sulfonamides, imides, and combinations thereof.

12. The composition of claim 1 wherein the composition is free of asphalt.

13. The composition of claim 1 wherein the monoprimary amine comprises one or more amines selected from the group consisting of octyl 3-aminopropyl ether, 2-ethylhexyl 3-aminopropyl ether, lauryl 3-aminopropyl ether, myristyl 3-aminopropyl ether, stearyl 3-aminopropyl ether, oleyl 3-aminopropyl ether, behenyl 3-aminopropyl ether and tridecyl 3-aminopropyl ether (linear or branched) and combinations thereof.

14. The composition of claim 1 wherein the curing agent has a Brookfield viscosity of 3000 cP or less at 25° C.

15. The composition of claim 1 wherein, when cured, the reaction product of the epoxy resin component and the curing agent exhibits a T$_g$ below 30° C. as measured by Differential Scanning calorimetry.

16. The composition of claim 2, wherein, when cured, the reaction product of the epoxy resin component and the curing agent exhibits a T$_g$ below 30° C. as measured by Differential Scanning calorimetry.

* * * * *